(12) United States Patent
Waide (10) Patent No.: US 12,467,438 B2
(45) Date of Patent: Nov. 11, 2025

(54) HUB FEED OIL SYSTEM

(71) Applicant: Archer Aviation Inc., San Jose, CA (US)

(72) Inventor: William Martin Waide, Central Point, OR (US)

(73) Assignee: Archer Aviation Inc., San Jose, CA (US)

(*) Notice: Subject to any disclaimer, the term of this patent is extended or adjusted under 35 U.S.C. 154(b) by 0 days.

(21) Appl. No.: 18/017,271

(22) PCT Filed: Jul. 21, 2021

(86) PCT No.: PCT/US2021/042527
§ 371 (c)(1),
(2) Date: Jan. 20, 2023

(87) PCT Pub. No.: WO2022/020438
PCT Pub. Date: Jan. 27, 2022

(65) Prior Publication Data
US 2023/0279847 A1    Sep. 7, 2023

Related U.S. Application Data

(60) Provisional application No. 63/055,697, filed on Jul. 23, 2020.

(51) Int. Cl.
| F04B 1/20 | (2020.01) |
| B64C 27/64 | (2006.01) |
| F04B 1/124 | (2020.01) |
| F04B 1/2035 | (2020.01) |
| F04B 1/2042 | (2020.01) |
| F04B 1/2078 | (2020.01) |

(Continued)

(52) U.S. Cl.
CPC .............. *F04B 1/124* (2013.01); *B64C 27/64* (2013.01); *F04B 1/20* (2013.01); *F04B 1/2035* (2013.01); *F04B 1/2042* (2013.01); *F04B 1/2078* (2013.01); *F04B 53/16* (2013.01); *B64C 27/32* (2013.01); *F04B 1/2064* (2013.01)

(58) Field of Classification Search
CPC .......... F04B 1/124; F04B 1/20; F04B 1/2035; F04B 1/2042; F04B 1/2064; F04B 1/2078; F04B 53/16; B64C 27/32; B64C 27/64
See application file for complete search history.

(56) References Cited

U.S. PATENT DOCUMENTS

| 3,698,189 | A | * | 10/1972 | Reimer | .................. | F16H 39/10 |
| | | | | | | 60/489 |
| 4,899,957 | A | * | 2/1990 | Eickmann | .............. | B64D 35/00 |
| | | | | | | 244/6 |

(Continued)

FOREIGN PATENT DOCUMENTS

WO    2009146060    12/2009

*Primary Examiner* — Michael Leslie
(74) *Attorney, Agent, or Firm* — FINNEGAN, HENDERSON, FARABOW, GARRETT & DUNNER LLP (57) ABSTRACT

One embodiment of a hub feed oil system is used to provide oil to components on the rotating side of an aircraft rotor hub system. A pump is configured so that a portion of the pump rotates with the rotating portion of the rotor system and a portion of the pump is fixed relative to the static portion of the rotor system. Multiple oil channels—with the provision of a variety of different pressures—may be provided.

20 Claims, 11 Drawing Sheets

(51) Int. Cl.
  *F04B 53/16*    (2006.01)
  *B64C 27/32*    (2006.01)
  *F04B 1/2064*   (2020.01)

(56) References Cited

U.S. PATENT DOCUMENTS

| | | | |
|---|---|---|---|
| 8,915,465 B1 * | 12/2014 | van der Westhuizen | ................... B64C 27/58 184/6.12 |
| 9,162,760 B2 * | 10/2015 | Fenny | ..................... F15B 7/003 |
| 10,145,367 B2 * | 12/2018 | Ishikawa | ................ F04B 27/08 |
| 10,677,207 B2 * | 6/2020 | Ashton | ..................... F04B 1/20 |
| 11,692,466 B2 * | 7/2023 | Tomescu | ................ B64D 33/08 464/7 |
| 2013/0177394 A1 | 7/2013 | Yamada | |
| 2017/0016432 A1 | 1/2017 | Ishikawa | |
| 2017/0328323 A1 | 11/2017 | Ashton et al. | |

\* cited by examiner

HUB FEED OIL SYSTEM

PRIORITY CLAIM

This application claims priority to PCT application Ser. No. PCT/US21/42527, filed Jul. 21, 2021, which claims priority to U.S. provisional application having Ser. No. 63/055,697 filed Jul. 23, 2020. These and all extrinsic material discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is fluid transfer across a rotating joint.

BACKGROUND

In rotor system applications, blade control actuators and electronics—located in the rotating hub of a rotorcraft—often require an active fluid supply for cooling and lubrication. Thus, there is a need to transfer oil from a static frame on the aircraft to the rotating frame of the rotor hub assembly.

SUMMARY

One embodiment of a hub feed oil system is used to provide oil to components on the rotating side of an aircraft rotor hub system. A pump is configured so that a portion of the pump rotates with the rotating portion of the rotor system and a portion of the pump is fixed relative to the static portion of the rotor system. Multiple oil channels—with the provision of a variety of different pressures—may be provided.

DETAILED DESCRIPTION

One common way of transferring fluid across a rotating joint is a fluid slip ring—a device that uses concentric metal cylinders with aligned annuluses. Such a system can have several downsides including: space requirements, weight, complexity, and a limited ability to provide a variety of different flow rates and pressures to the rotating portion of the hub.

Conventional fluid slip rings require an oil outfeed assembly capable of transferring high pressure oil into the hub. This singular supply is then divided into user circuits requiring different flow rates and pressures. Such an arrangement often results in some hub mounted components being over-supplied while other hub mounted components are provided with inadequate pressure. What is needed is a hub feed system that that eliminates the oil outfeed gland and provides discrete distribution channels—each capable, when required, of outputting high pressure. This is needed, for example, to feed the rotating planet assembly of an adjacent gear reduction system, or to lubricate actuators, or to cool the sensitive electronics on the rotating hub side.

The problem is solved—in some embodiments herein—by way of a hub feed oil pump. One embodiment of a hub feed oil pump comprises a pump configured to be disposed at a rotational interface—especially the rotational interface of an aircraft rotor drive system. The pump may be of any type, but especially preferred embodiments use a swashplate pump type design. However, other types of pumps may be used.

By using multiple pump chambers, useful flow variations can be provided. Take for example a hub with three actuators and three electronic users requiring twice the cooling of the actuators. A 9-piston pump can have three duplexed fluid channels for electronics, and three single outlets for the actuators.

A further system advantage is that the effectiveness of the heat transfer arrays inside the electronics boxes is related to local oil velocity at the metal/oil interface—high feed pressures can produce the required local velocities.

The pump system—in many embodiments—is configured to increase the pressure of the fluid as the pump system transfers the fluid from the static inlet to the rotating outlets.

The rpm and volume of the pump may be relatively low such that the system is lightly stressed leading to very long service life, and because of the small discharge volumes, the dimensions are compact.

Multiple pistons can be used to achieve useful flow variations. For example, in a rotor hub system with three actuators and driver electronics, the driver electronics might require twice the cooling flow relative to the oil flow requirements of the actuator. A nine piston pump can have: three duplexed outlets for electronics; and, three single outlets—expected to be at a higher pressure—for the actuator.

Figure 1:
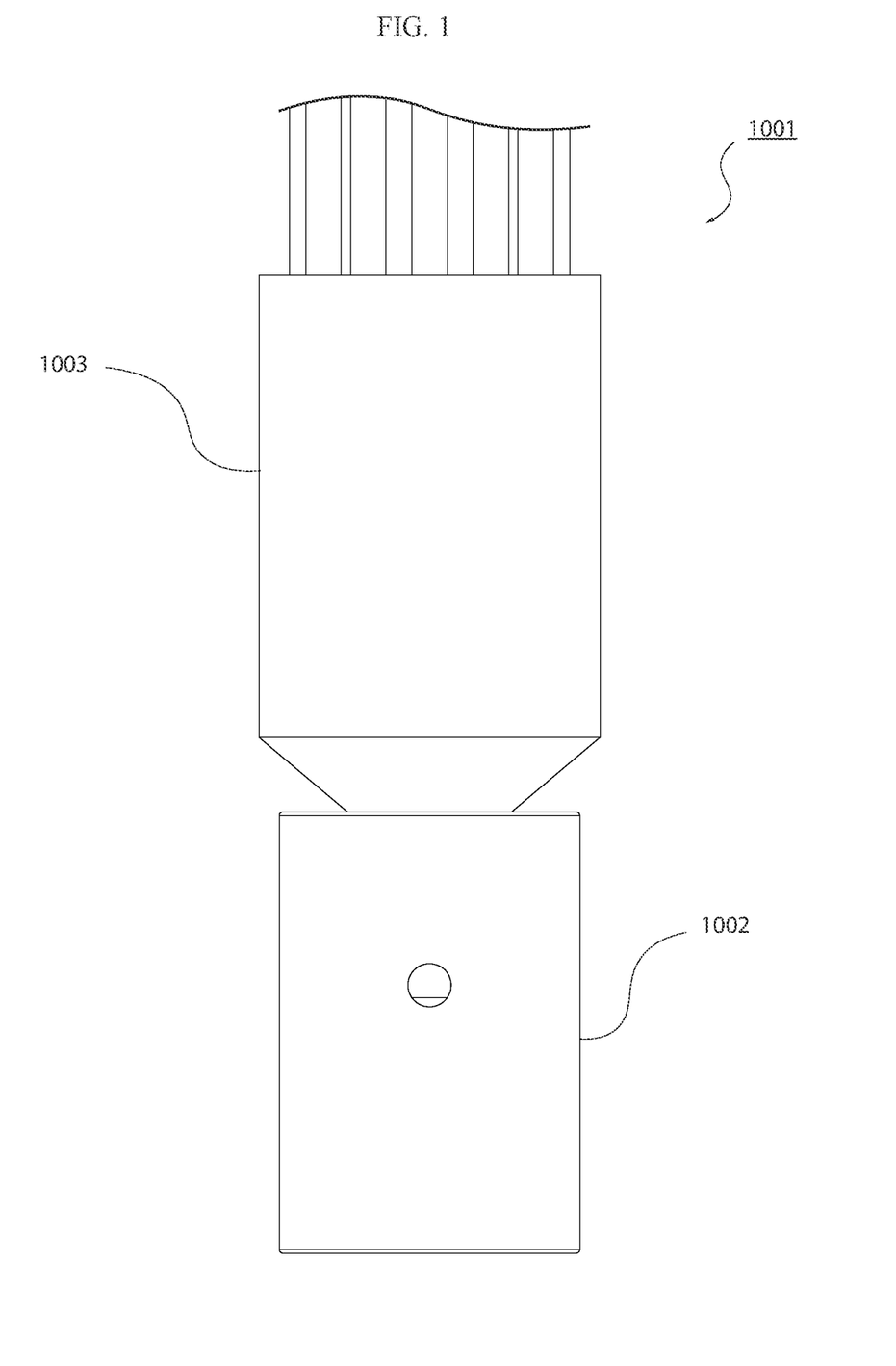
FIG. 1 shows an illustration of an exemplary embodiment of a hub feed oil pump.

Shown in FIG. 1 is an exemplary embodiment of a hub feed oil pump. Hub feed oil pump 1001 comprises a static portion 1002 and a rotating portion 1003.

Figure 2A:
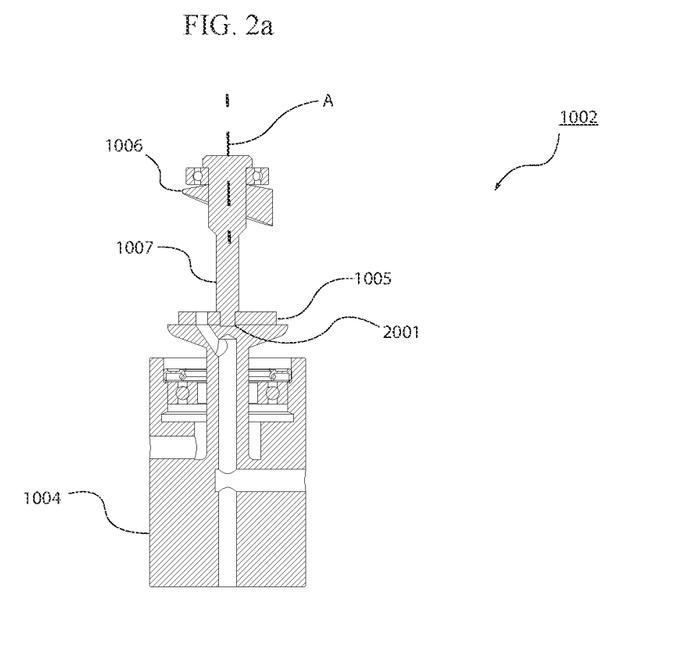
FIG. 2a is a section view of a static portion of one embodiment of a hub feed oil pump.
Figure 2B:
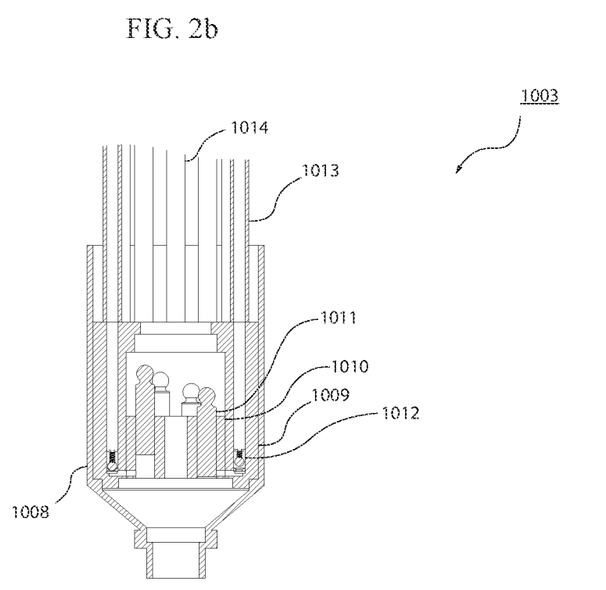
FIG. 2b is a section view of a rotating portion of an embodiment of a hub feed oil pump.

FIGS. 2a and 2b show cross-section views of the non-rotating portion and the rotating portion of an exemplary embodiment of a hub feed oil pump.

In the embodiment shown in FIGS. 2a and 2b, the static portion 1002 comprises: a static main housing 1004; a single port valve plate 1005; a swashplate 1006; and a swashplate shaft 1007. The rotating portion 1003—shown in FIG. 2b—comprises: rotating main housing 1008; rotating main housing insert 1009; cylinder barrel 1010; pistons 1011; check valves 1012; rotating assembly oil supply lines 1013; and rotating assembly oil return lines 1014.

On the static portion 1002, the swashplate shaft 1007 and is keyed into fixed housing by way of key feature 2001. The swashplate 1006 is rotationally fixed relative to swashplate shaft 1007—that is it cannot rotate relative to swashplate 1007 about the A-axis.

Fixed portion 1002 is configured to be fixed relative to a non-rotating portion of an aircraft rotor system—for example, the fuselage of a helicopter or a nacelle of a tiltrotor aircraft. The rotating portion of the hub feed oil pump 1003—including rotating housing 1008—is configured to rotate with the hub and rotor of the aircraft. For example, rotating portion 1003 may rotate with the proprotor, propeller, or rotor of a tiltrotor aircraft, such as the quad tiltrotor eVTOL illustrated in FIG. 7.

Figure 7:
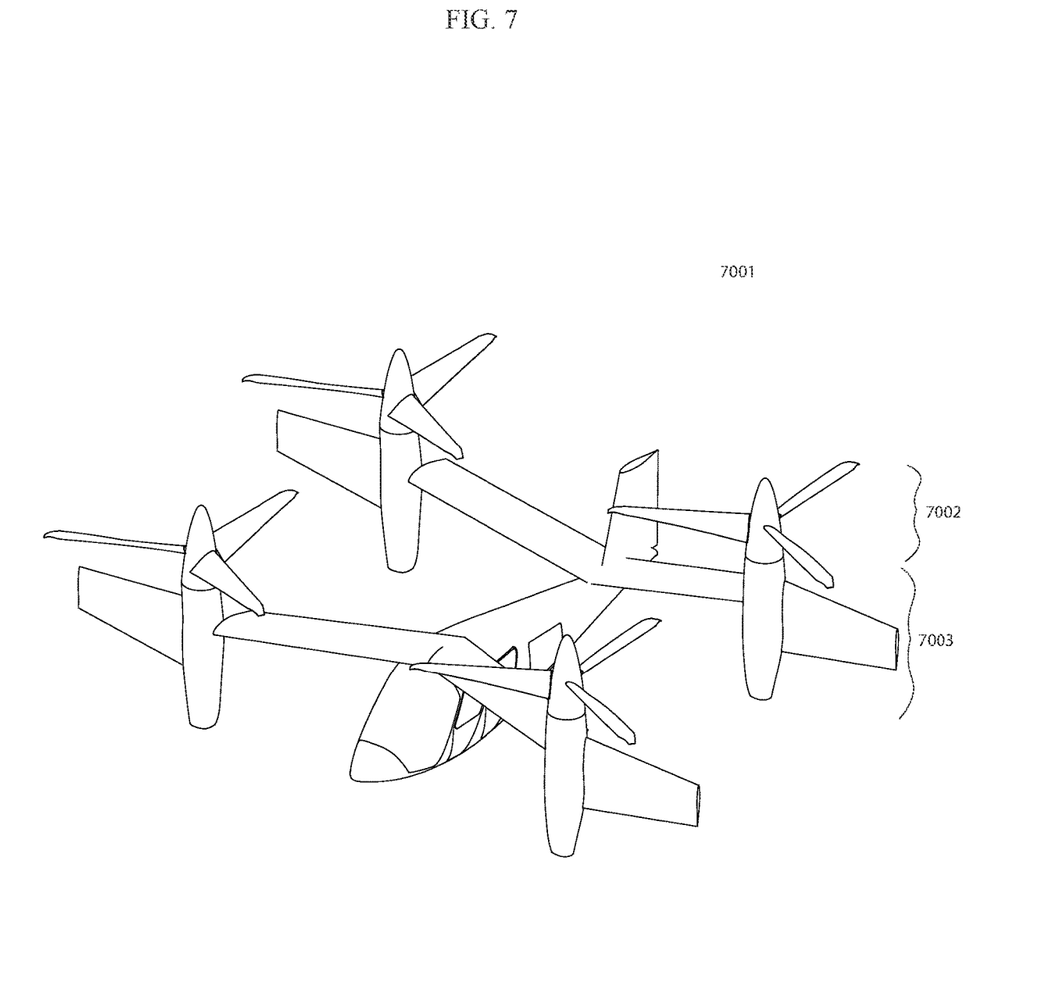
FIG. 7 shows one possible aircraft on which an embodiment of a hub feed oil system could be implemented.

In the embodiment of FIG. 7, the rotating assembly comprises a rotor assembly 7002 and the static assembly comprises a nacelle assembly 7003.

Figure 3:
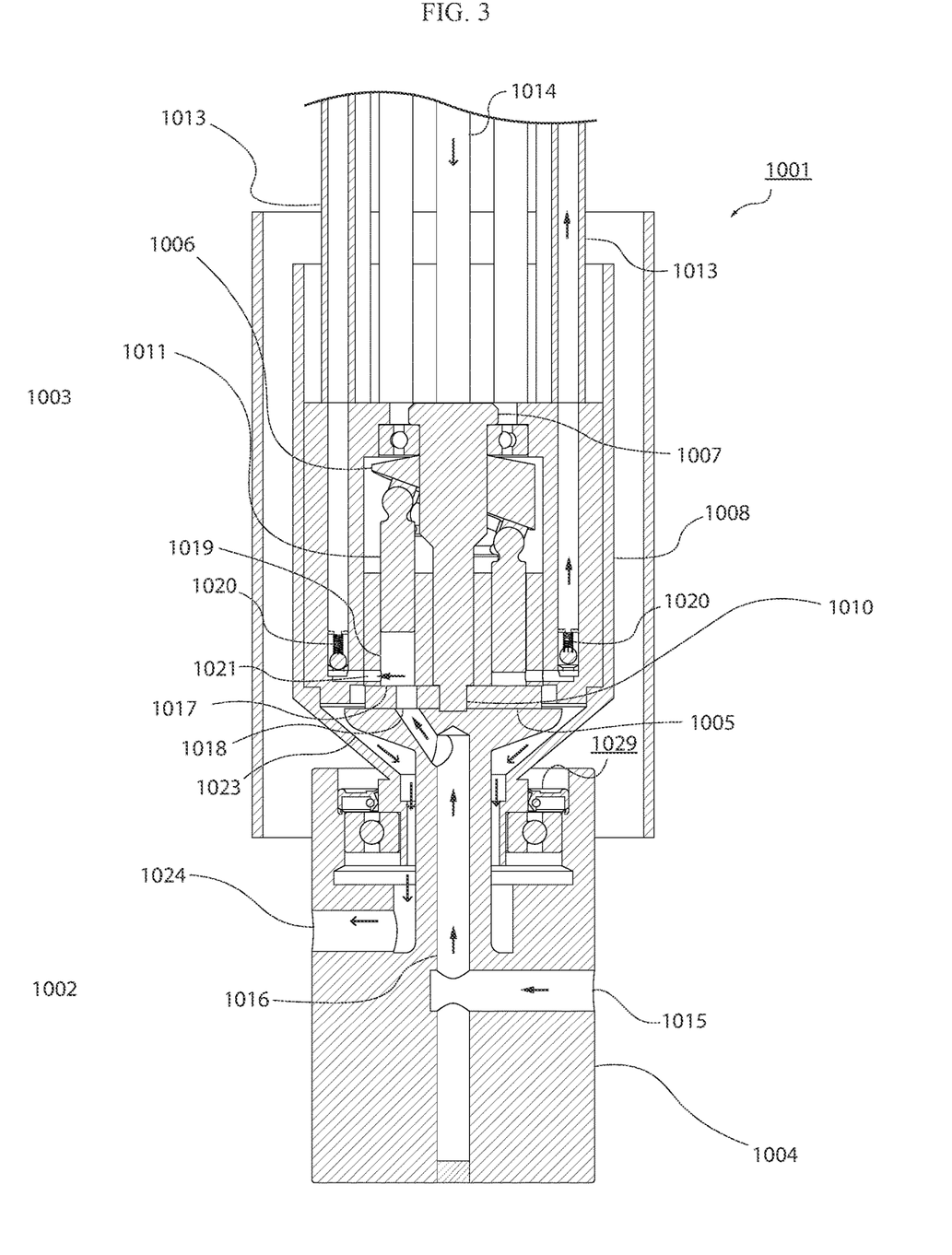
FIG. 3 illustrates a section view of one embodiment of a hub feed oil pump.
Figure 4:
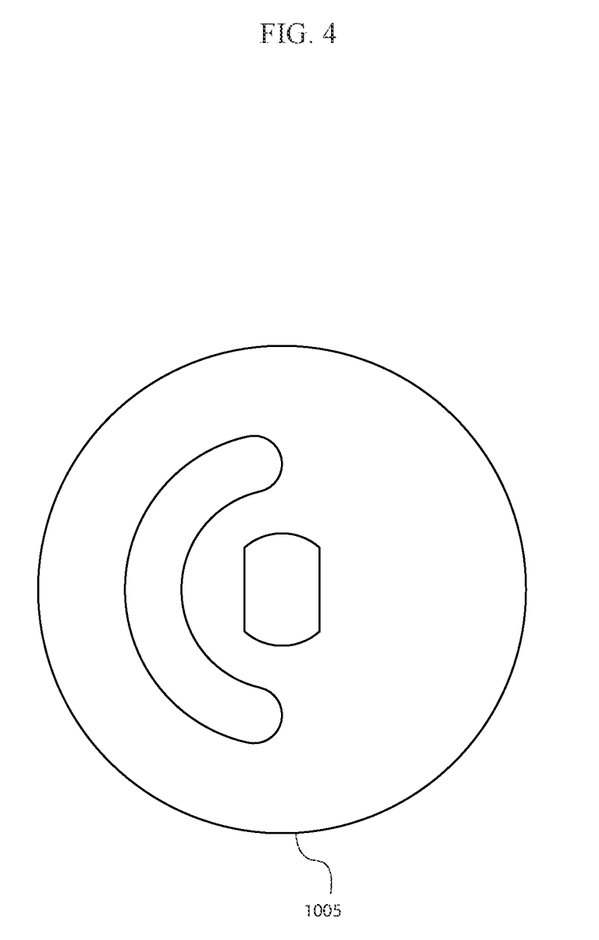
FIG. 4 is a view of one embodiment of a single port valve plate.

Looking to FIG. 3, low pressure oil is fed into low pressure inlet 1015. The oil follows inlet oil passageway 1016 to the hub feed oil pump rotating joint interface 1017. Static main housing 1004 has a semicircle port feature 1018 in the area near the interface. The single port valve plate 1005 has a similar single port valve plate semi-circle feature 3001. A top view of the single port valve plate 1005 is shown in FIG. 4.

The oil flows up through inlet passageway 1016 through semicircle port feature 1018, through the single port valve plate 1005, and into the pump cylinders 1019 that are aligned with the single valve plate port feature 3001 at a given time. As the rotating housing—and the cylinder barrel which is fixed to the rotating housing—rotates around, the respective piston will push the oil out of the cylinder chambers 1019, through side ports 1021 and past check valve 1020 to rotating assembly oil supply line 1013. Single valve plate port feature 3001 extends about only half of the single valve plate's axial clocking. As a cylinder chamber 1020 rotates over the non-ported portion of the single port valve plate 1005, the oil contained within the cylinder chamber will be pushed out the side port 1021.

Figure 5:
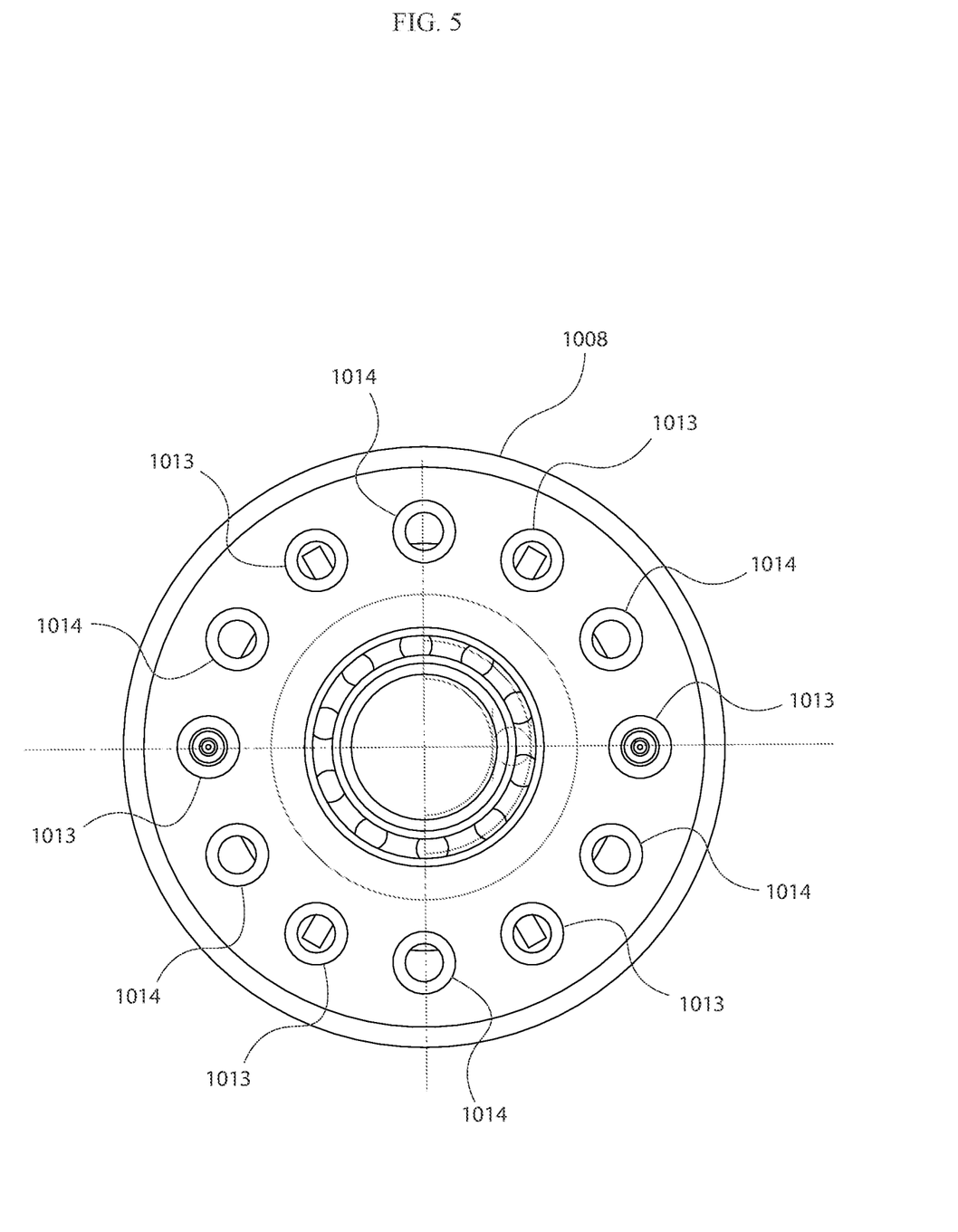
FIG. 5 shows a top view of an embodiment of a hub feed oil pump.

The oil is then available to supply to components on the rotor hub, including: actuators, electronics, or individual blade control actuators. The oil lines in the rotating frame are configured to return oil to rotating assembly oil return lines 1014. FIG. 5 shows a top view depicting one possible arrangement of rotating assembly oil supply lines 1013 and rotating assembly oil return lines 1014 through rotating housing 1008. The rotating assembly oil supply lines 1013 shown in FIG. 5 lead away from cylinder chambers 1019, while the rotating assembly oil return lines return oil back to oil return collection chamber 1023. From oil collection chamber 1023, the oil then flows back to the static housing 1004. The returned oil then flows out of the hub feed oil pump, through oil return port 1024.

The oil may then be directed to an oil collection tank or a heat exchanger for cooling before being pumped back to the hub feed oil pump 1001.

Figure 6:
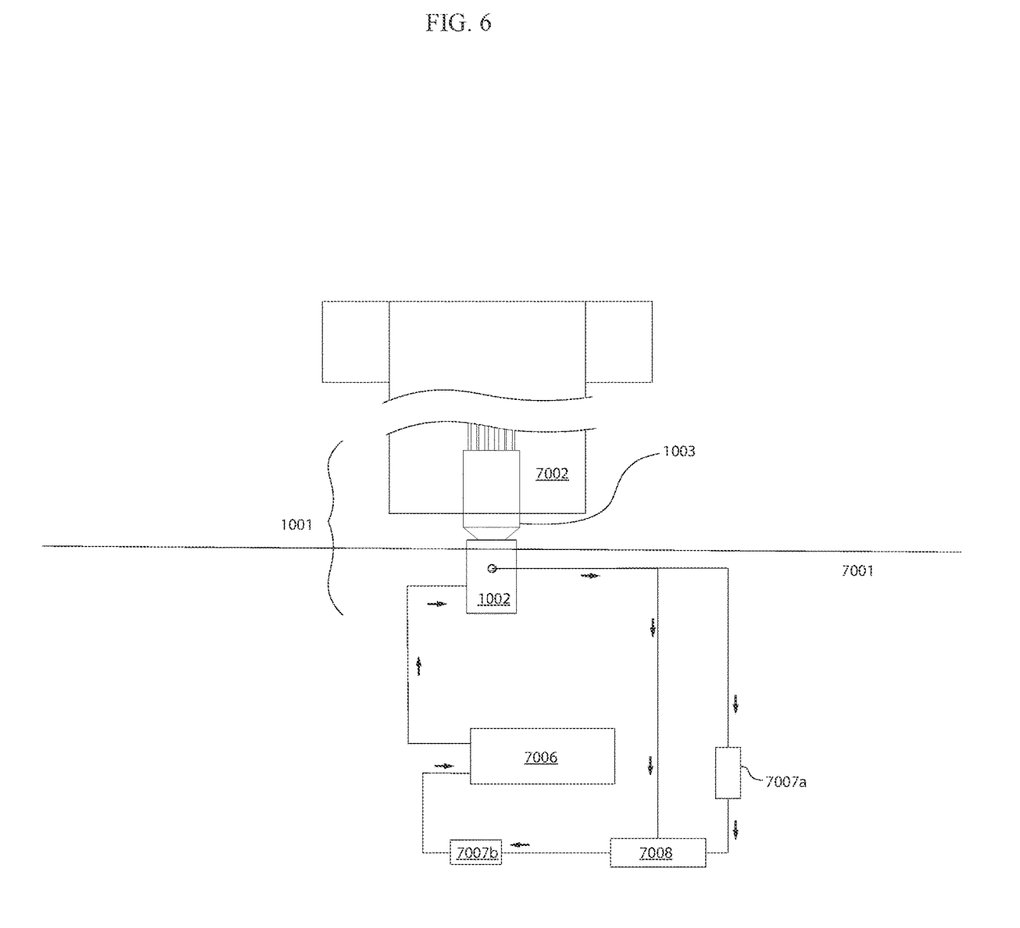
FIG. 6 illustrates one possible arrangement for incorporating an embodiment of a hub feed oil pump into an aircraft.

FIG. 6 illustrates an example of how a hub feed oil pump may be integrated into an aircraft. The hub feed oil pump is disposed across a rotary interface between a static assembly and a rotating assembly of a rotorcraft. The static portion 1002 is fixed to a static assembly 7001 of a rotor support system—for example, the nacelle of a tiltrotor aircraft. The rotating portion 1003 is fixed to a rotating assembly 7002 of the rotor drive system—for example, a rotor hub of a tiltrotor aircraft. From the hub feed oil pump, oil flows to reservoir 7008. Alternatively, the oil may be pumped—by scavenge pump 7007a—to oil reservoir 7008. From reservoir 7008, oil is moved—by pump 7007b—to heat exchanger 7006. From heat exchanger 7006 oil flows to the inlet port of the hub feed oil pump 1001. Pumps 7007a and 7007b may comprise any suitable type of pump. For example the pump can be a gerotor pump, a centrifugal pump, or a swashplate pump. Oil pump 7007b is preferably a medium pressure pump.

Figure 8:
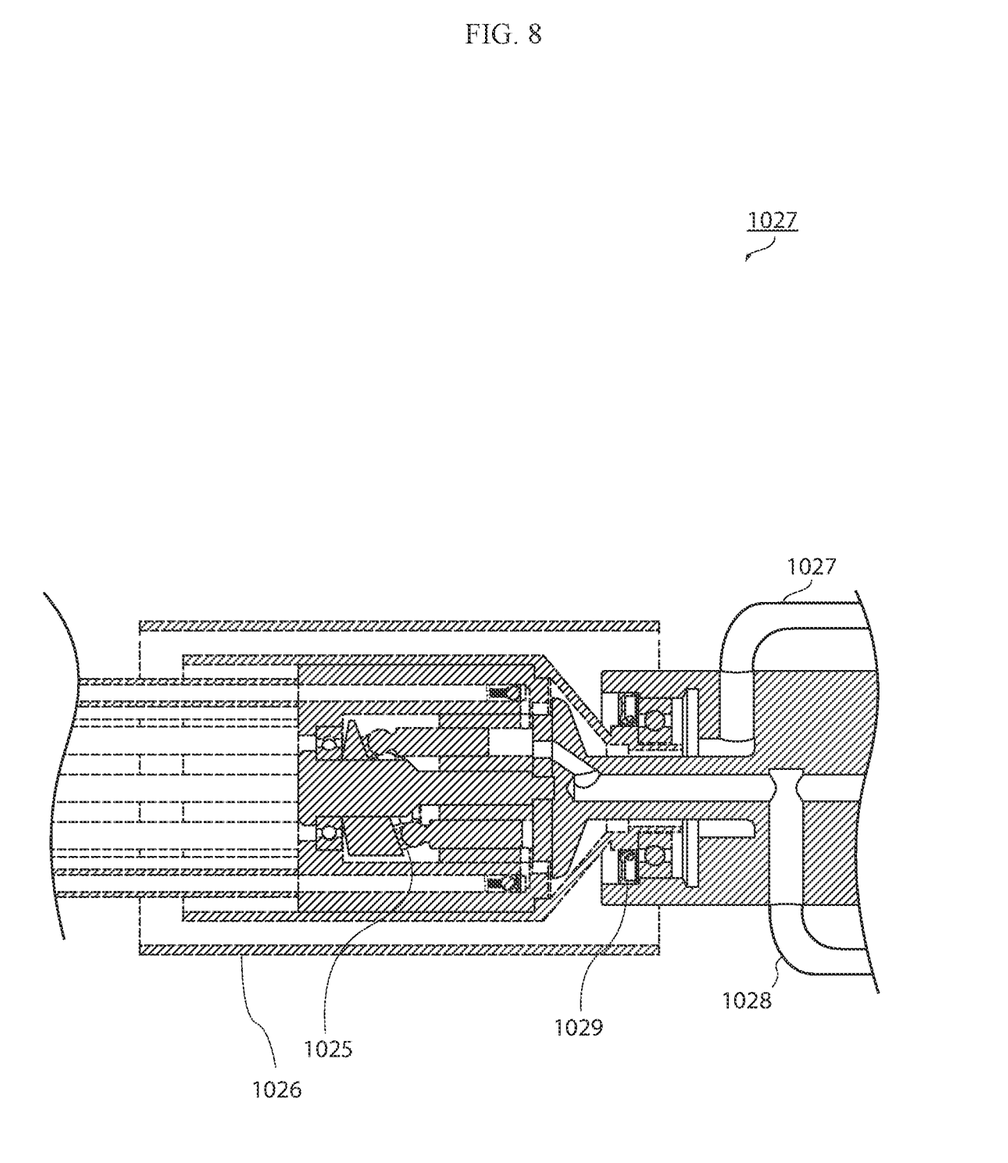
FIG. 8 shows a section view of an embodiment of a hub feed oil system illustrating some of the static parts and rotating portions.

In FIG. 8, one embodiment of a hub feed oil pump 1001 is illustrated. The dashed line components represent components that rotate with the rotating portion of the hub assembly while the solid line components represent components that do not rotate with the rotating portion of the hub assembly. Also shown in FIG. 8 are piston shoes 1025, and rotating portion outer sleeve 1026. Used oil free return line 1028 and mild in-feed oil pressure line 1027 are also shown. The used oil free return line is at ambient or atmospheric pressure, so the singular seal 1029 needed to isolate the entire system from the outside atmosphere is not exposed to pressure.

Figure 9:
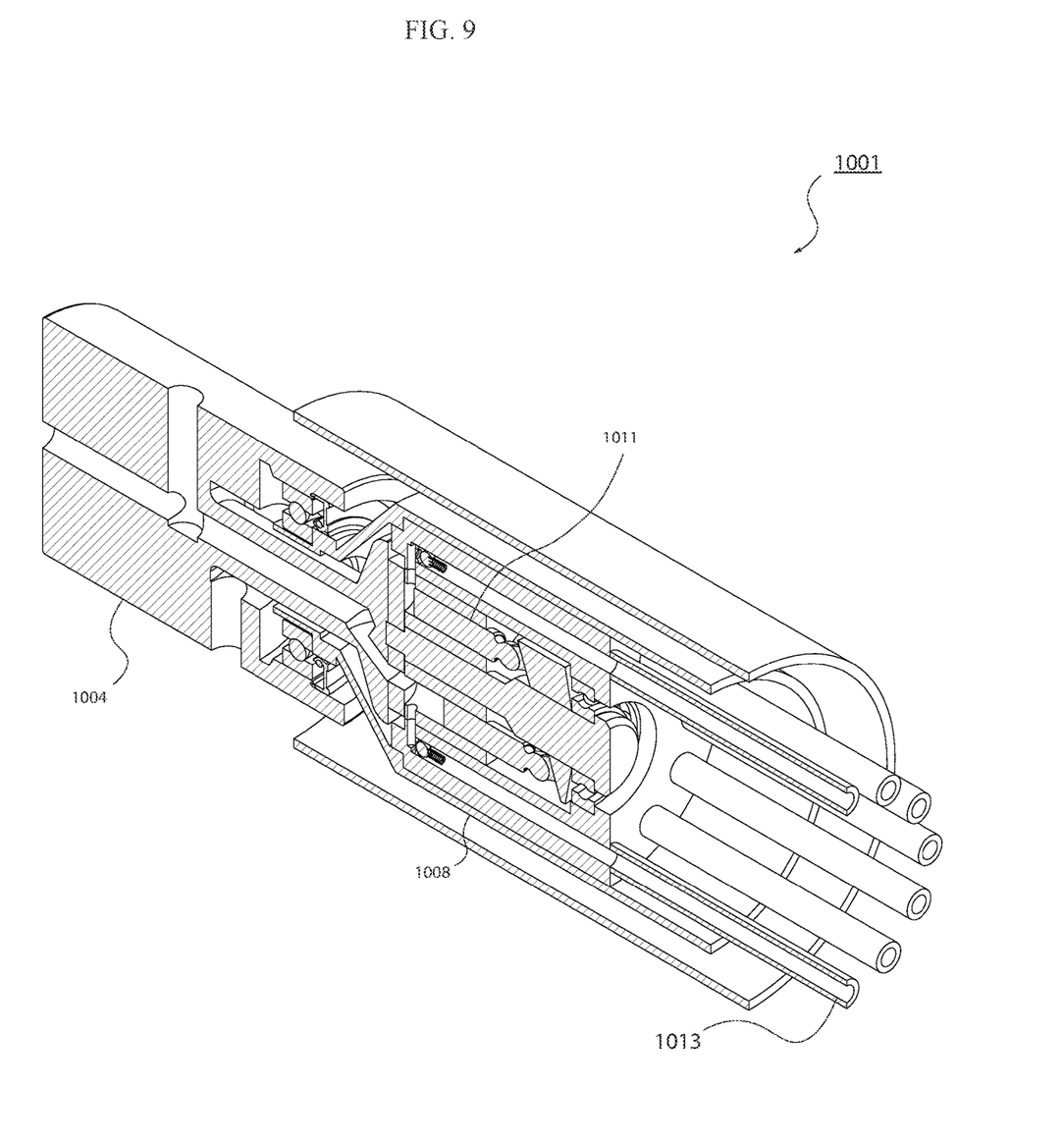
FIG. 9 is an alternative view of a cutaway of one embodiment of a hub feed oil pump.

FIG. 9 shows a perspective cutaway view of a hub feed oil pump 1001. Pistons 1011 and rotating assembly oil supply lines 1013 are shown.

Figure 10A:
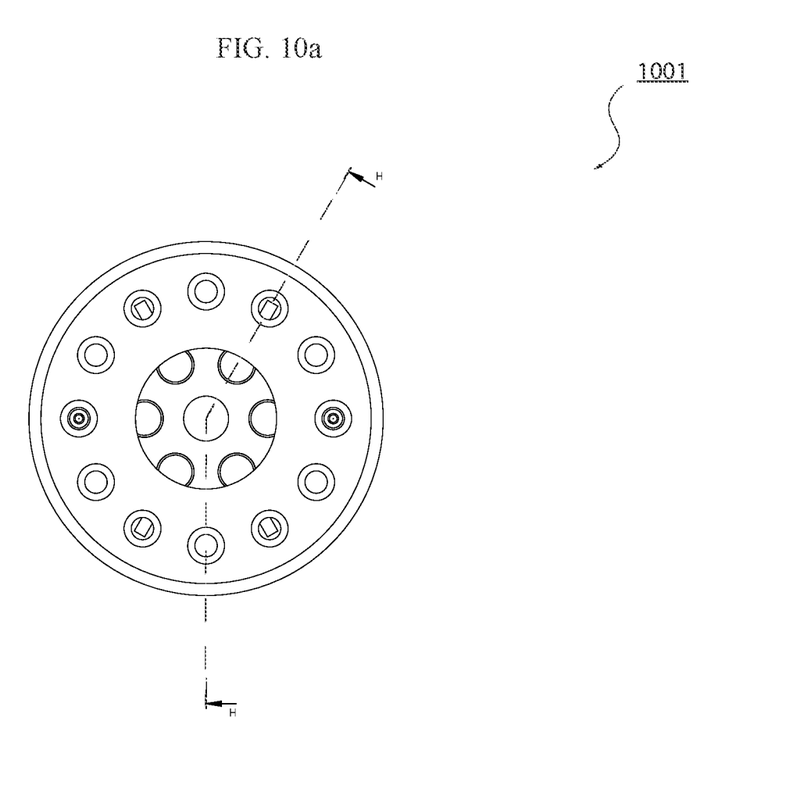
FIGS. 10a and 10b illustrate a cutaway of one embodiment of a hub feed oil pump; the view shows one possible way of routing hub side oil supply lines and hub side oil return lines through the rotating portion.
Figure 10B:
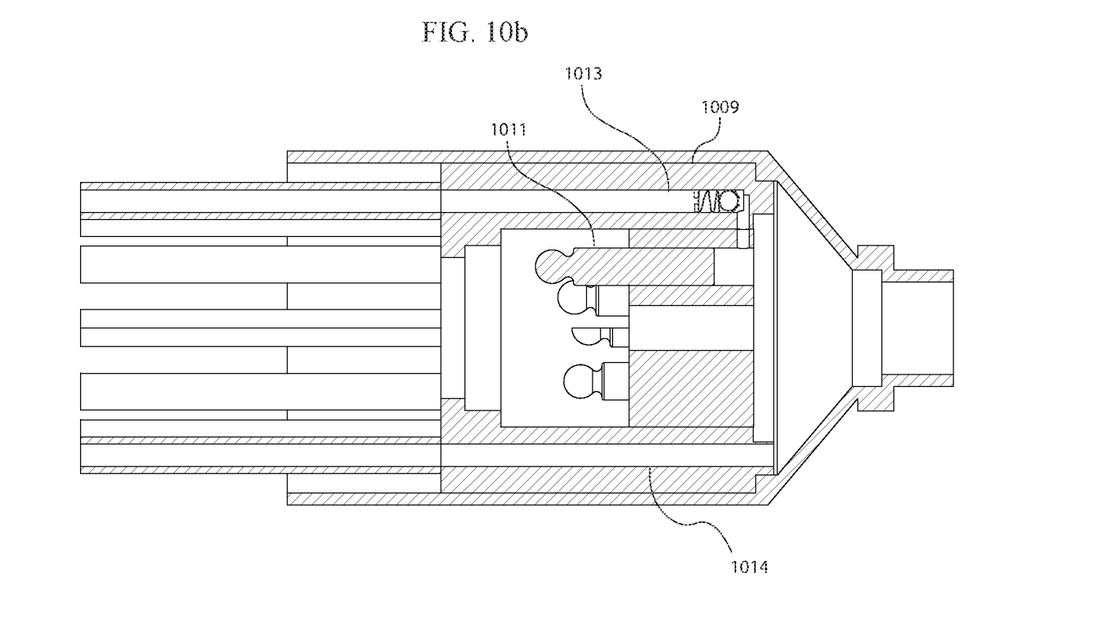

FIGS. 10a and 10b show a section view of hub feed oil pump 1001. The section view shows rotating assembly oil supply lines 1013 and rotating assembly oil return lines 1014.

Figure 11:
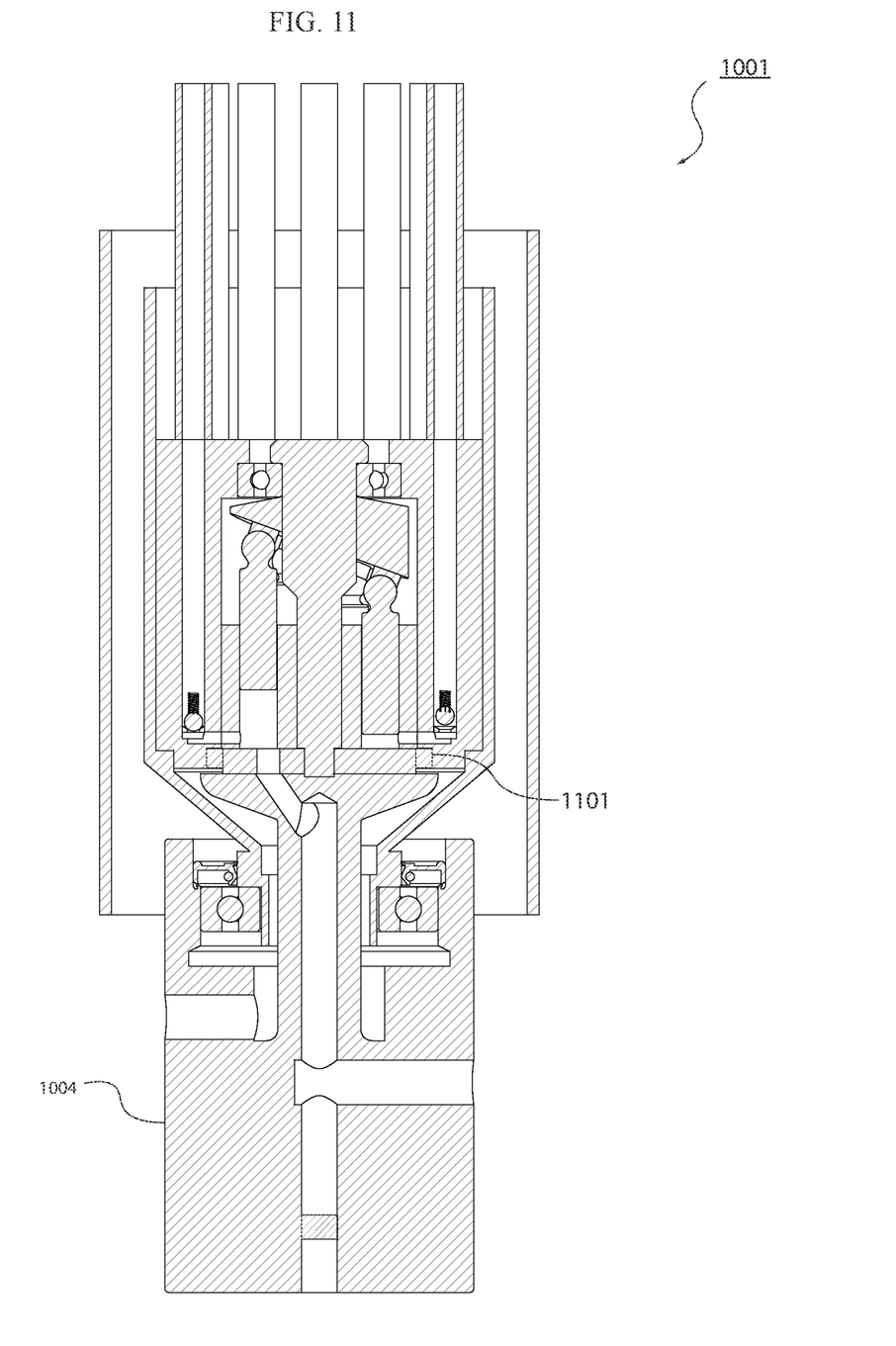
FIG. 11 shows a section view of one embodiment of a hub feed oil pump; an optional seal is illustrated.

FIG. 11 illustrates an alternate embodiment of a hub feed oil pump 1001. The pump in the embodiment of FIG. 11 comprises single port valve plate seal 1101. The seal can seal oil from leaking past a cylinder side wall and the single port valve plate.

Embodiments may use any desirable number of channels and components dimensions to suite the application. For example, different size pistons and stroke lengths can be used to accomplish different flow volumes at a specified pump rpm.

The pump may be configured to work at any desired rotor speed rpm—since in especially preferred embodiments the hub feed oil pump is configured to co-rotate with the rotor hub. In one especially preferred embodiment, the pump is configured to operate in a window around 300 rpm; however, the pump is configured to operate—as well as provide proper flow and pressure supply—across the range of operational speeds of the rotor.

The rotating assembly oil supply lines 1013—connected from their respective check valves 1020—are at hub speed and can be connected to any user. The torque reaction is carried back to static portion 1002, and this non-rotating shaft, being hollow, conveniently carries the incoming fluid to the single port valve plate 1005.

The single port valve plate 1005 is a highly finished sealing surface with very low leakage. One nicety of such an arrangement is that it does not require the engineering of high-pressure seals. The plate may be made of any suitable material including steel, brass, bronze, self-lubricating brass, plastic, ceramic, composite, resin, or any other suitable material. The plate could be heat treated to obtain more desirable properties.

In some embodiments the swashplate 1006 may be configured for in-operation adjustment. Such a configuration would allow real time adjustment of pressures.

The pumps of many of the embodiments will increase relative flow rates as the rotor rpm increases. In configurations where the hub side oil requirements increase proportionate to rotor rpm, such a characteristic is ideal. For example, if the heat output of the hub side electronics of a particular rotor system required more cooling as rotor rpm increased, the increased demand would be met by system design without any additional active flow control. Alternatively, the swashplate 1006 may be configured to be adjustable to provide consistent flow rates throughout the rotor's rpm range. Other suitable mechanisms for flow rate adjustment may be implemented.

It should be understood that unless otherwise expressly stated, each item could be one piece or multiple joined pieces. For some items, it may be preferable to make the item as multiple pieces due to manufacturing considerations.

In some embodiments, the swashplate hub oil feed pump may have a misalignment feature to accommodate misalignment between the fixed housing and rotating housing.

Unless otherwise expressly stated, components may be made of metal, plastic, composites, resin, ceramic, or any other suitable material.

The bearing and seals may be any suitable bearings and seals.

It should be recognized that concepts taught herein can equally apply to propeller systems, rotor systems or proprotor systems—whether used in a helicopter, airplane, tiltrotor aircraft or any other type of aircraft. The term rotor should be understood to encompass rotor, propeller, and proprotor. Additionally, rotor blade should be understood to encompass rotor blade, propeller blade, and proprotor blade.

While many embodiments discussed herein are especially well suited for use in aircraft, it is contemplated that some embodiments could be well suited for fluid transfer across rotating joints in a wide variety of other applications such as automobiles, industrial equipment, oil and gas machinery, or any other suitable application.

It is contemplated that a system such as the one disclosed in some of the embodiments herein could be configured to be used with various fluids. While oil is discussed in the context of many of the embodiments herein, it should be understood that any other suitable fluid could be used in place of oil, such as glycol.

The invention claimed is:

1. A pump configured to be disposed across a rotary interface between a static assembly and a rotating assembly such that a first portion of the pump is fixed relative to the static assembly and a second portion of the pump is fixed relative to the rotating assembly, wherein the pump is configured to transfer fluid from the static assembly to the rotating assembly, wherein the first portion of the pump has an inlet and a port, wherein the second portion of the pump has a plurality of pistons and a plurality of piston cylinder chambers disposed circumferentially around an axis of rotation of the rotating assembly, and wherein the inlet and port fluidly couple with each of the plurality of piston cylinder chambers during a rotation of the rotating assembly.

2. The pump of claim 1 wherein the rotary interface is a rotary interface on an aircraft.

3. The pump of claim 2 wherein the rotary interface is an aircraft propulsion hub interface.

4. The pump of claim 3 wherein the aircraft propulsion hub interface is a rotor hub interface.

5. The pump of claim 1 wherein the pump comprises a swashplate pump.

6. The pump of claim 5 wherein the swashplate pump comprises a piston and a piston barrel configured to rotate with a rotating portion of the pump.

7. The pump of claim 6 additionally comprising valve plate configured to remain static with the static assembly.

8. The pump of claim 1 additionally comprising a first rotating portion outlet and a static portion inlet, wherein the pump is configured to increase a pressure of the fluid between the static portion inlet and the first rotating portion outlet.

9. The pump of claim 8 further comprising a second rotating portion outlet.

10. The pump of claim 9 wherein the second rotating portion outlet is configured to output fluid at different pressure than the first rotating portion outlet.

11. The pump of claim 10 wherein the pump is configured to provide hydraulic fluid to individual blade control actuators on an aircraft.

12. The pump of claim 1 additionally comprising six outlets, wherein a first outlet and a second outlet are configured to output fluid at different pressures.

13. A pump comprising an inlet and outlet wherein the outlet rotates relative to the inlet.

14. A method for providing oil from a static frame to a rotating frame of an aircraft propulsion system, wherein the static frame comprises an inlet and a port and the rotating frame comprises a plurality of pistons and a plurality of piston cylinder chambers disposed circumferentially around an axis of rotation of the rotating frame, wherein the inlet and ort fluidly couple plurality of piston cylinder chambers during a rotation of the rotating frame, the method comprising the steps of:
providing fluid to the inlet and port at a first pressure; and
increasing the pressure of the fluid as the fluid moves from the port of the static frame and through the plurality of piston cylinder chambers of the rotating frame.

15. The method of claim 14, wherein the port is a semicircle.

16. The pump of claim 1, wherein the port is a semicircle.

17. The pump of claim 1, wherein the static assembly further comprises a swashplate.

18. The pump of claim 17, wherein the plurality of pistons are disposed between the port and the swashplate.

19. The pump of claim 18, wherein the swashplate has an angled surface relative to the axis of rotation.

20. The pump of claim 1, wherein the plurality of pistons and the plurality of piston cylinder chambers are disposed circumferentially around the axis of rotation.

* * * * *